April 11, 1939.     F. H. SCANTLEBURY     2,153,595

ILLUMINABLE FIXTURE

Filed Jan. 5, 1938     3 Sheets-Sheet 1

INVENTOR.
FRANCIS H. SCANTLEBURY
BY
ATTORNEY.

April 11, 1939.  F. H. SCANTLEBURY  2,153,595
ILLUMINABLE FIXTURE
Filed Jan. 5, 1938  3 Sheets-Sheet 2
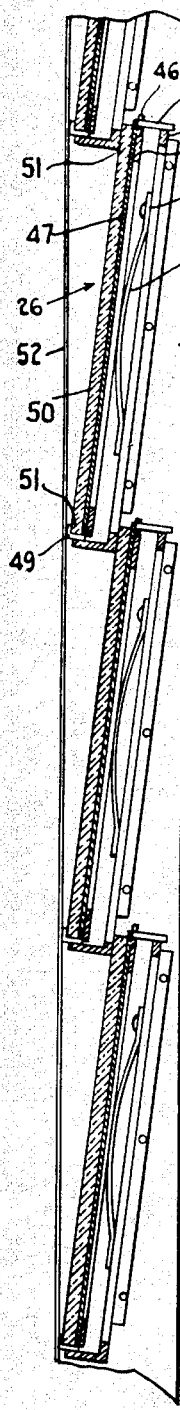
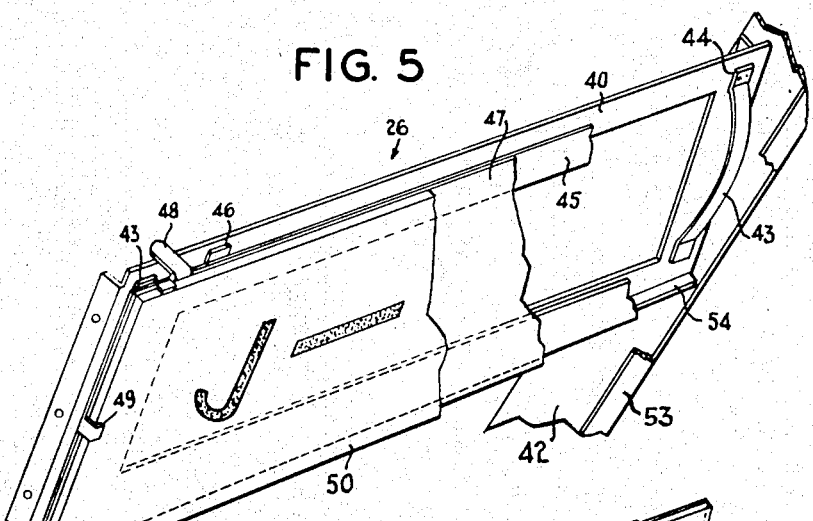
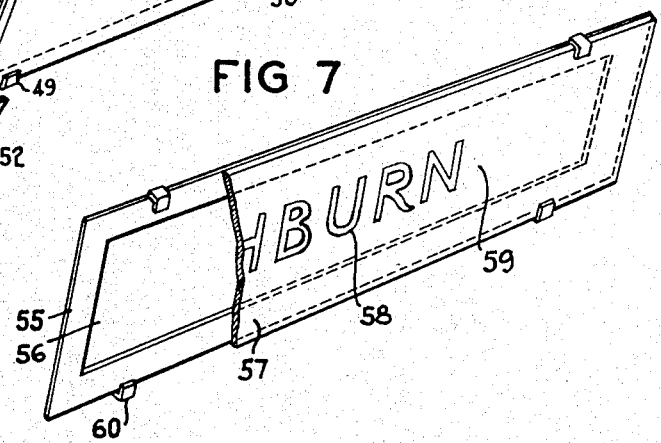
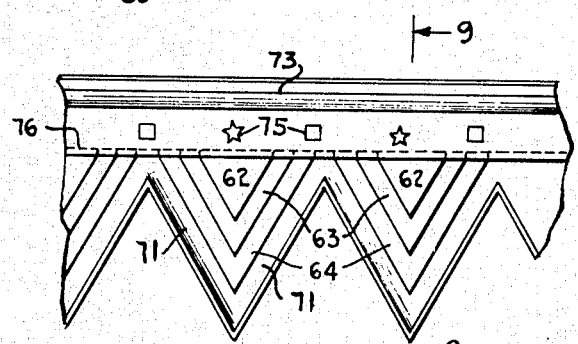
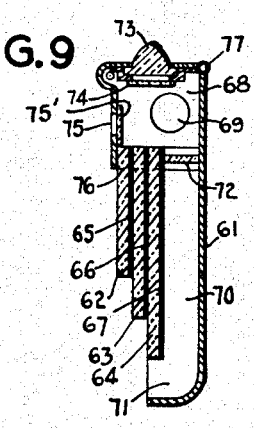
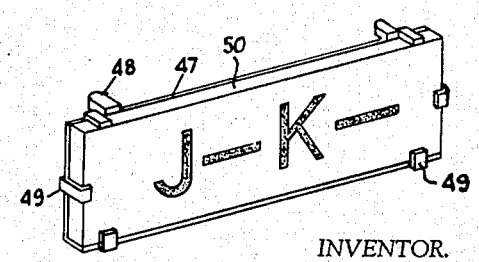
INVENTOR.
FRANCIS H. SCANTLEBURY
BY
ATTORNEY.

April 11, 1939.    F. H. SCANTLEBURY    2,153,595
ILLUMINABLE FIXTURE
Filed Jan. 5, 1938    3 Sheets-Sheet 3

INVENTOR.
FRANCIS H. SCANTLEBURY
BY
ATTORNEY.

Patented Apr. 11, 1939

2,153,595

UNITED STATES PATENT OFFICE 2,153,595

ILLUMINABLE FIXTURE

Francis H. Scantlebury, Brooklyn, N. Y.

Application January 5, 1938, Serial No. 183,445

23 Claims. (Cl. 40—130)

The invention relates to illuminable display devices and illuminable fixtures, more particularly to that type in which light rays from a suitable source of illumination are permitted to enter an edge of one or more transparent or hyaline plates or panels and, by internal reflection within these plates, set up the illumination of such indicia or display matter as may be applied to the said plates; as well as to the type in which the indicia are illuminated by transmitted light; and to combinations of the said two systems of illumination.

It is an object of the invention to provide apparatus and fixtures of this nature which may be made to serve not only a decorative and/or advertising purpose, as well as affording a certain degree of illumination, but a further purpose in that, in many instances, rays from the illuminating source which are not utilized for internal reflection in the hyaline plates and/or for back illumination thereof may be diverted to the useful purpose of general illumination, as of a room.

Another object of the invention resides in the provision of a decorative illuminating device which may be applied, for example, to the ceiling of a room. This same device may be modified slightly, if desired, and artistically applied as illuminable panels to the walls; or, it may be further adapted to what is known as cove or indirect lighting. In the latter case, the illumination, from an unseen source, is usually established at about the conjunction of a wall and ceiling, with the free light rays generally caused to be spread over the ceiling, which acts as a reflecting medium for directing said rays downwardly into the room.

The invention has for an object, also, to provide a novel means of lighting embodying illumination both by internal reflection and by direct and/or reflected light.

The invention has for a further object to control the color of the free light rays to afford pleasing softness of color tones.

Still another object is to provide an illuminated directory board suitable for use, for example, in apartment houses, or as a building directory, or for advertising purposes; and to so construct the same as to admit of ready and inexpensive replacement of individual panel elements embodied in the novel board.

A still further object resides in the provision of a novel panel element for use in such directory board.

In carrying out the invention, the display device or illuminable fixture comprises a plurality of panel elements carrying the matter to be displayed, which matter may be of an informative or advertising nature, or purely decorative, or both. These panels are of transparent or hyaline material such as glass and are designed, preferably, for illumination by internal reflection of the matter depicted thereon, although in some instances backlighting thereof only is contemplated, or both systems of illumination may be adopted. The panel elements may be arranged within a suitable receiving element or frame-like holder in such a manner as to afford respectively successive illuminable display areas when viewed from the front of the holder, and each area is provided, especially with the internal reflection system, in part at least with an opaque backing. To secure this successive arrangement, the mounting of the panels is such that the same are located in adjoining parallel planes and are displaced, or have portions thereof displaced, relatively to one another in the direction of their respective planes.

In the case of internal reflection illumination, the arrangement is such as to afford an edge of each of the panels for exposure to a source of light associated with the panels, for example, in the holder therefor. This type of illuminated device, as well as the back-lighted type, is associated in certain modifications with means for diverting a portion of the rays from the light source for general illumination of the surroundings.

The nature of the invention, however, will best be understood when described in connection with the accompanying drawings, in which:

Fig. 4 is a fragmentary enlarged sectional view of a number of panels and supporting rack therefor.

Fig. 5 is a perspective detail view of a panel showing its position when mounted in a receiving element or supporting member, portions of which are broken away, as well as portions of the panel.

Fig. 6 shows in perspective a panel or indicia-bearing unit with its backing plate and apart from the mounting or receiving element.

Fig. 7 is a perspective view of a modified form of panel.

Fig. 8 is a fragmentary elevation of a decorative lighting unit employing the novel principles involved; and Fig. 9 is a transverse section thereof taken on the line 9—9, Fig. 8, showing the general arrangement and relationships of the different panels to one another and to the source of illumination.

Figure 1:
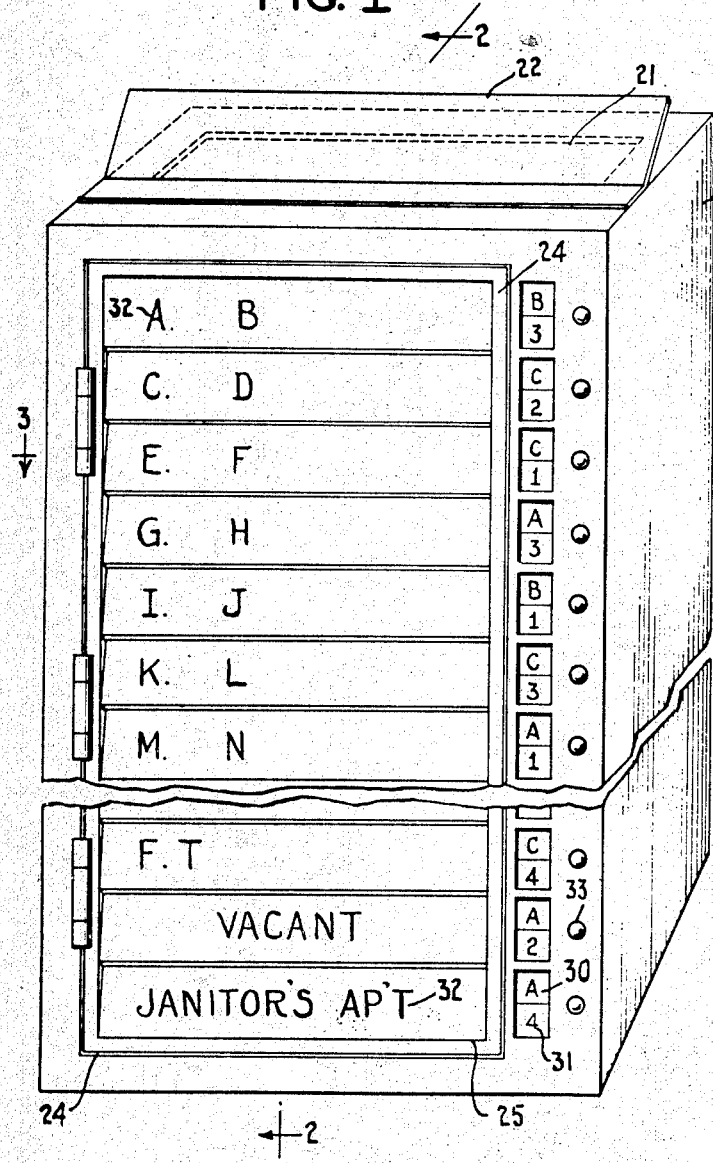
Fig. 1 shows in isometric projection a bulletin or directory board, as setting forth one embodiment of my invention.

Referring to the drawings, more particularly Fig. 1 thereof, there is indicated, as one embodiment of my invention, an illuminated directory, for example, suitable for use in apartment houses. As shown, this comprises a retaining case or holder 20, usually of metal, and which may be rectangular or square in shape as the conditions of design may warrant; and the same is formed, preferably, with a shielded opening 21 at the top, having a baffle 22 mounted thereover generally in an oblique position. The purpose of this opening is to provide ventilation of the case, as well as to permit rays from a light source, as the electric lamps 23, to pass through the opening for wall-illuminating purposes.

Mounted on the face of the case, usually with hinges, is a panel-supporting door which embodies a frame-work 24, preferably of metal, carrying a protective plate-glass panel 25. Behind this plate-glass panel are mounted a series of indicia-bearing panel members or units 26; and behind these are located one or more of the electric lamps 23. The mounting of these indicia-bearing or display panels will be hereinafter more fully described.

The interior of the case 20 is generally finished in a light-reflecting color to enhance the illumination of the matter on the panels; and the various panels are so mounted, in the instant embodiment, that an edge 27 of each panel is exposed to direct or reflected light rays from the source of illumination. To this end, the forward face of each panel rests at one edge against the back face of its preceding panel, or rather its mounting, to form thereby a closure or light seal between the successive panels and prevent the leakage of light rays over the face of the panels, which would result somewhat in a dimming of the illumination on the panel indicia.

Figure 2:
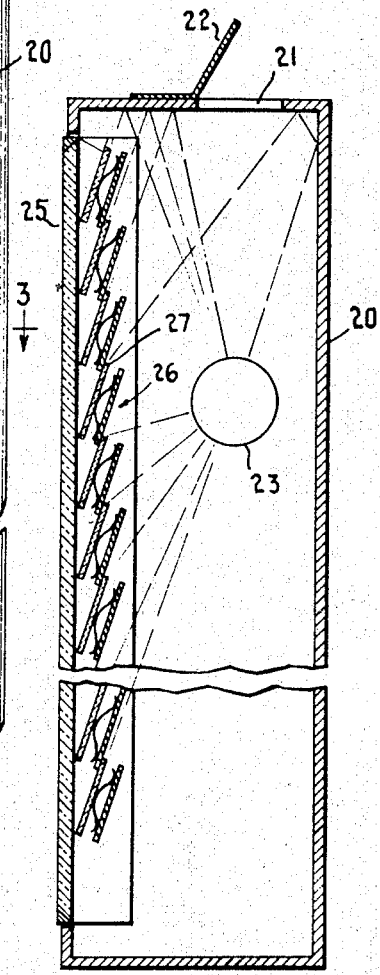
Fig. 2 is a vertical section therethrough, taken on the line 2—2, Fig. 1; and illustrates the mounting for the individual panels, and the manner in which they are exposed to the light rays from a source of illumination.
Figure 3:
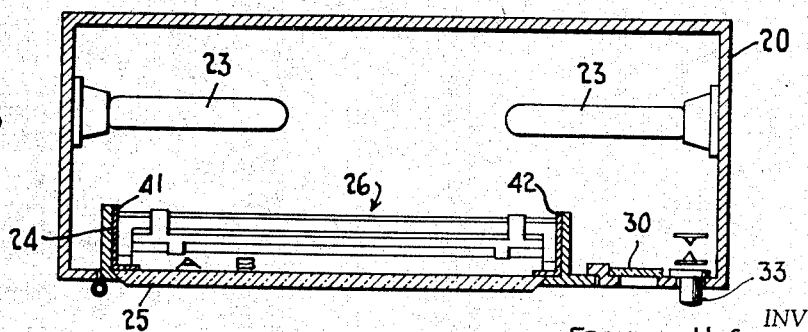
Fig. 3 is a horizontal section, taken on the line 3—3, Fig. 1, and looking in the direction of the arrows.

As indicated in Fig. 2, by the dotted lines, some of the rays of light from lamps 23 strike the exposed edge of a glass panel directly, whereas other edges receive the illumination by reflection.

A transparent or translucent strip 30 runs vertically inside the case adjacent to the panel door; and is intended to bear indicia 31 indicating, in the particular embodiment, generally the number of the apartment occupied by the tenant whose name 32 appears on the illuminated panel adjacent thereto. In line with the tenant's name and the apartment number is a pushbutton 33 intended to sound a signal in the apartment noted, as is well understood. The apartment numbers 31 on the vertical strip are intended to be illuminated by light from the interior of the case passing through the vertical strip.

Referring to Figs. 4 and 5, 40 designates a panel-supporting member or holder which is welded or otherwise permanently secured to vertical upright members 41 and 42, which upright members in turn are secured to the door along its sides and run generally the vertical length of the cabinet. The panel-supporting number 40 affords offset rack elements for mounting a plurality of the panels, and may be solid throughout or be constituted as a plurality of open frames, as shown. Each frame is provided with flat springs 43, one of whose ends 44 is secured to the member 40, the other end being free to slide on the member as the spring is compressed or released.

Secured to a set of the springs 43, of which there are usually two respectively along the sides of each frame, is a panel carrier or slide holder 45 which may be solid or as a frame with opening to register with a corresponding rack opening. The holder is provided also with one or more lugs 46 which are used to draw it against the spring pressure when it is desired to insert the indicia-bearing unit. The latter consists of an assembly of two plates, the first being an opaque metal plate 47 having backwardly-directed lugs 48 which engage the member 40 to establish its position when inserted. It has further lugs 49 which are bent over and hold an indicia-bearing hyaline plate 50 to the plate 47. The said plate 47 is opaque and generally black, although any dark color may be satisfactorily used thereon.

The plate 50 is generally of glass, preferably clear glass, although it may be of any suitable hyaline material; and the indicia thereon are usually applied to the back thereof, preferably etched, although a passable job can be made by printing the same thereon or securing paper letters in optical contact. When etched, it may be desirable to pigment the indicia for better legibility when the panels are not illuminated or "cold". The term "indicia" is understood to include a translucent panel etched over its entire surface.

It will be seen by this overlapping construction that the indicia-bearing unit may readily be slid into or out of position in the panel assembly at will; and, when removed, the backing plate 45 will be urged forwardly by the springs 43 and, if solid, will close the opening 51 created by the withdrawal of the indicia-bearing unit. In the case of the open frame, as shown, a filler plate (not shown) may be slid into position in the panel-supporting member in place of a removed panel. This will blank the opening; and the filler, if desired, may display suitable legends or designs, for example, printed upon its exposed face. A unit or filler will be resiliently held in position in the holder against inturned lateral flanges 52 and 53 of the upright members 41 and 42, respectively, and supported on a ledge 54 of the panel-supporting member 40.

As indicated more clearly in Fig. 4, the series of individual panels or indicia-bearing units overlie one another and with at least one edge of each indicia-bearing plate exposed for the entrance of light rays. For example, the lower edge of the one unit is located in front of and overlies slightly the upper edge of the unit immediately below it, while its upper edge lies behind the unit immediately above it. That is to say, the elongated units which are shown as located in parallel planes are displaced to a more or less extent, in a direction transversely of their lengths, or in their planes, with reference to one another.

The novel arrangement of the indicia-bearing units set forth permits also their individual and easy withdrawal for such corrections and substitutions as may be desired. Moreover, the units are of such a nature that they may conveniently be modified as to the matter to be displayed and at relatively low cost, it being necessary merely to provide a new plate 50, bearing the desired matter, and the backing plate 47 therefor, the whole affording a convenient unit for shipment, if necessary, and ready for insertion into the holding rack at the desired location.

The novel rack mounting for display units affords also a convenient arrangement for indicia-bearing units designed to be illuminated according to the so-called "back-lighting" system. When this system is used, a different form of indicia-bearing panel is employed, as set forth in Fig. 7. As shown in this figure, the backing plate or frame 55 has an aperture 56 in the central portion thereof. In front of this frame is mounted an indicia-bearing plate 57 which may be of glass, Celluloid, wax paper, or any transparent or translucent material; or, if desired, the indicia may consist of a series of perforations forming the lettering in a plate of any suitable opaque material. When the units are thus designed for illumination by transmitted light, the indicia 58 will be light-transmitting and the field 59 will be opaque or at least of such a degree of opacity as to form a contrast between the indicia and said field when lighted. However, if perforations were used to pass light from the interior of the cabinet, it would be necessary to print the indicia on a background (not shown) for daylight reading. Perforations in such case would generally be made within the bars of the letters composing the indicia.

For accuracy and convenience in assembling the panels, certain lugs 60 are provided on the frame 55. These lugs are bent over plate 57 thus securing the proper relationship of the frame 55 and the plate 57 and constituting a complete panel unit.

These back-lighted plates when assembled are inserted into or withdrawn from the rack in the same manner as described for the edge-lighted panels.

The novel overlying or displaced arrangement of panel elements to form an illuminated unit of display areas in different planes also lends itself readily to room illumination fixtures and art designs embodying a great variety of light effects. Thus, reference being had to Figs. 8 and 9 of the drawings, 61 designates a metallic frame or supporting member with hollow portion for a plurality of hyaline plates or panel elements. This frame is intended to support a series of hyaline plates around the wall of a room, which plates may be variously formed to set up an illuminated, decorated artistic border affording beautiful and variously colored light effects. Such border can also be employed, for instance, along the front of and underneath the top rail of a bar, and in combination with a similar border running along the upper parts of cafe or restaurant walls, whereby artistic room decoration is provided. For this reason the length of such unit is indeterminate, and depends entirely upon how much wall coverage may be desired in achieving the artistic decoration desired. It may be used also as a decorative panel for rooms in the home and to afford indirect illumination thereof.

The frame 61 supports various hyaline plates or panel elements 62, 63, and 64; and, in the particular instance shown in the drawings, these panels are of triangular form, one panel extending over the other, so that a portion only of each panel is exposed to display the desired ornamentation or indicia which is preferably etched or sand-blasted thereon or otherwise arranged for optical contact with the exposed surfaces, preferably the rear surface. Each one of these panels, as shown in Fig. 9, is backed with an opaque sheet 65, 66, and 67, respectively, and extending over the entire back areas of the respective panels. The purpose of these opaque sheets is to exclude the entrance of any light into the hyaline panels from the rear, and to accentuate the illumination the indicia will receive through the edge thereof.

This is effected by exposing the upper edges of these panels in a light chamber 68 provided in the present embodiment in the upper portion of the frame 61, and in which chamber is located a suitable lamp or lamps 69. As this type of fixture is of indeterminate length, it is more advantageous to use long tubular lamps positioned lengthwise through the light chamber in the frame to give as near as possible an unbroken flood of light in said light chamber and over the exposed edges of all the hyaline plates in the unit.

The particular embodiment shown in Figs. 8 and 9 illustrates, also, what might be called a border well comprising a channel 70 running down from the light chamber 68 behind the plate assembly and forming a horizontally directed bend 71 below the panels. This bend is shown in the form of a trough edging the various panel assemblies in the unit in a triangular saw-tooth manner. The interior of this channel 70 is generally highly polished so as to reflect the light rays coming into it and, on account of the rounded bend 71, gives the effect of a bar of light completely edging the unit.

This bar of light may be affected with respect to its color by the interposition of color screens 72 within the channel, which color screens may vary in color throughout the length of the unit, if desired, to set up a changing color scheme.

When this unit is mounted low enough along a wall, further decorative effects can be achieved by mounting in the top of the frame molded translucent ornaments or bars 73. These ornaments will be illuminated from the interior of the frame directly from the lamp 69, and color effects may be had by the interposition of a color screen 74 mounted directly below the base of the ornament through which the light rays pass. Further ornamentation can be applied to the face of the light chamber in a similar manner by providing therein translucent openings as shown at 75, Fig. 8. These openings may be ornamental in design and backed up with frosted or colored glass or other translucent material 75' and as may be desired.

With further reference to the frame 61, in general construction this will be of metal formed to receive and retain panels as shown. In the present construction, a unit is shown wherein the panels are pendant from the light chamber and the panels, being of a triangular form, are simply inserted through their small end in a slot 76 that is too short to permit the base of the triangle to pass through. In this manner they will remain pendant and in proper fixation. The frame 61, moreover, is shown provided with a hinge 77 along one of its upper edges which will permit the top of the frame to be swung open for the purpose of relamping the unit and for the insertion or withdrawal of panels. No means is shown for mounting this frame on the wall as this is usually done while panels are removed and the frame attached to the wall by screws through its back wall. The edges of the panels 62, 63, and 64 which are exposed to the light may, if desired, be coated with a transparent screen of coloring matter that will, as is well understood, cause the light rays entering therethrough to impart color to the indicia in the panels; or, if without indicia and wholly etched, to present the different exposed portions of the panel elements illuminated in various colors.

Figure 10:
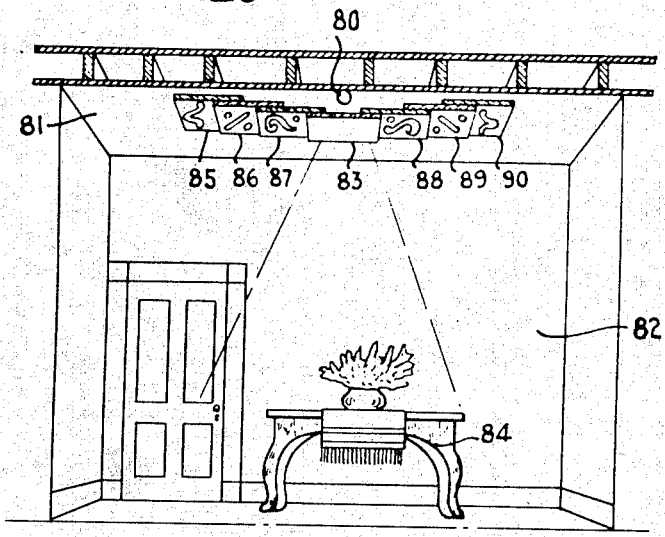
Fig. 10 is a perspective view of a room with a different form of decorative panel unit which is indicated as mounted on the ceiling thereof.
Figure 11:
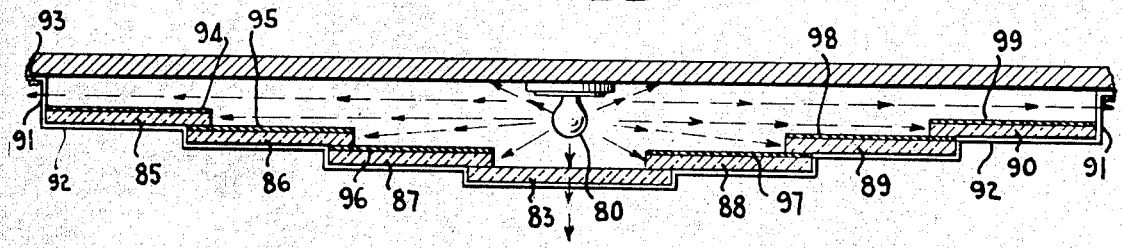
Fig. 11 is an enlarged longitudinal section through the center of the unit shown in Fig. 10, and sets forth the relationship of the various panel elements to one another and to the source of illumination, as well as the opaque backing applied to each panel.

A further application of displaced decorative panel units is set forth in Figs. 10 and 11, in which panels are shown as mounted on the ceiling of a room as an indirect illuminating unit. In this instance, the panels are illuminated from a central light source, the rays from which spread in opposite directions striking the exposed edges of respective sets of panel elements so that the light may enter the said panels and illuminate the indicia thereon. Such rays as do not enter the panels escape along the ceiling as the unit is displaced somewhat therefrom; and they act to illuminate by direct rays of light a considerable, if not the entire, area of the ceiling. This is effected, also, in such a manner as to disperse enough light from said ceiling to provide a soft and even illumination throughout the entire room.

The illuminating unit is, of course, not confined to any particular form or shape; and in its ensemble it may be circular, square, diamond-shaped, or whatever the architect may desire, the essential principles thereof being that the light source be hidden and that rays of light therefrom shall enter into the various panel elements constituting the complete unit and that other rays from said light source not used in illuminating the panels be allowed to spread along the ceiling for illuminating purposes. Such panel decorations need by no means be confined to the ceiling. They are just as applicable to the side walls of a room, and the illumination of such walls by the free rays from the light source would effect just as beautiful and harmonious a lighting effect as if the unit were mounted on the ceiling.

In the particular design shown in Figs. 10 and 11, 80 indicates the light source which may be a light of any preferred shape. In practice it has been the custom to use one or more ordinary electric lamps mounted in the ceiling 81 of a room 82 and over the center of the decorative illumination unit. If more than one lamp are used, it has been the practice to group the lamps, although good results are obtained if the lamps are spread out behind the panel unit instead of grouping. It is all a matter of taste and effect desired.

With further reference to these figures, 83 indicates a translucent center panel which is used in some cases to give a spot-light or flood-light effect directly downwardly, as indicated by the broken lines. This effect would be used mostly, for example, where a table 84 is located such as in dining rooms, or as a card table. The effect then produced is a flood-light effect on the table, the color effect in the panels 85-90, inclusive, and a soft room illuminating action from the direct rays of light escaping from behind the unit and illuminating the ceiling 81.

The sectional view, Fig. 11, affords a better idea of the unit and shows the panels lying in a frame-work or straps 91 suspended from the ceiling and providing a series of supporting steps 92 in which the respective panels are retained. This frame, of course, does not cover the entire face of any of the panels but provides for exposed areas upon which are the designs. It is to this end of a skeleton nature and generally is placed at the edges of the unit, or an intermediate strap may be used in case the span of the panel is of such a nature as to require further support from the ceiling. At its ends, the straps of the frame may be turned upwardly to the extent of the desired displacement from the ceiling and also bent over to afford attaching lugs 93.

In this figure is also shown the respective opaque backing members 94-99 associated with each panel, the purpose of which has already been explained. It will be noted, however, that the opaque backing has been omitted from the back of translucent panel 83 as this is the panel that permits light to pass through for the purpose of flood-lighting. This figure illustrates, by means of arrows, the direction of the light rays from the light source 80, and shows also the edges of the panels exposed thereto and the clearance space between the entire unit and the ceiling, whereby the ceiling illumination is achieved.

In the showing of the fixture as a ceiling unit, the same is set up as a purely horizontal fixture in which the panel elements of the fixture spread from either side of the illuminating source at an angle of 180°. For corner fixture, this angle can be changed to 90°; and, in fact, one side of the panelling can be eliminated altogether, if so desired, having the panel elements extend in one direction only. Furthermore, the panelling in such a fixture need not be limited to two sets of panels extending in different directions, but additional groups of panelling may be set up extending out radially from the central illuminating means in as many sets of panelling as the design desired may dictate.

Figure 12:
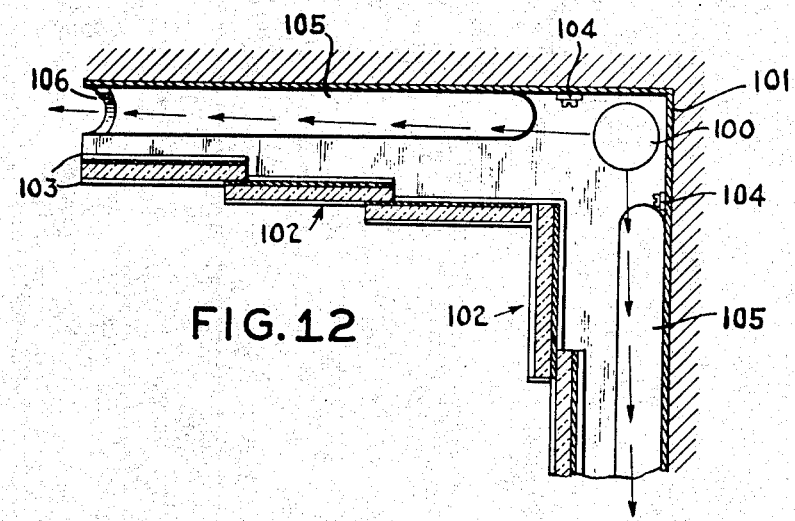
Fig. 12 is a fragmentary vertical section showing an illuminated unit as embodied in a corner bracket, and the arrangement of the panels with respect to one another and to the iluminating source.

Fig. 12 illustrates a further modification of the panel unit, the same being shown in angular form. In this particular embodiment, the light source 100 is shown mounted in the angular portion or corner of the unit frame 101. This unit is intended to be mounted at the junction of the wall and the ceiling, and due to its form as a right angle, acts as both a wall light and ceiling light through light rays emanating from the concealed lamp located behind the illuminable panels 102 which follow the angular configuration of the frame. The figure shows principally the general form that may be used with such a unit; and the frame-work 101 supporting the panels is generally of a plate formation dependent upon the richness of the unit and may be of art iron or bronze, or of any metal or other material that may be deemed suitable.

Usually, the construction would involve a right and left frame, each side being equipped with the necessary angles and steps 103 to support the illuminable panels 102 in their required position; and the frame is further provided with suitable lugs 104 whereby it may be fastened to the wall and the ceiling. The sides of these frames are provided with openings 105 through which a portion of the light rays may escape to illuminate respectively the wall and ceiling. The front and bottom ends may also open as at 106 to permit further distribution of light rays not used for the purpose of illuminating the panels, as is indicated by the arrows.

One form of applying the design or indicia to the panels, especially as a ceiling and wall panel unit, is through the medium of sandblasting or acid etching. By this means, the design is cut into the surface and to an extent to catch readily the light that passes into the glass panel through its edge, thus illuminating the design by internal reflection of the rays, while the rest of the panel that is not etched is not illuminated at all but appears dark, being backed by opaque material. Much the same effect is produced when the panels are merely painted or the design provided in optical contact with a panel, except that the effect of illumination is not quite so brilliant and pleasing as when the design is deeply etched; but any applied design in optical contact will illuminate to a certain extent, particularly when applied to the reverse side of the glass so that the design is actually seen through the glass.

When an etched design is used, the entire design may also be pigmented with an enamel. The purpose in doing this is to render the design more legible when the panel is not lighted; and, frequently, in order to enhance the beauty of the cold or unlighted panel, a properly contrasting background is utilized. In most cases, it is customary to use an opaque backing on the panel. Generally, this backing has been black, but it is by no means vital that black be established as a necessary color for this backing. Therefore, in order to produce pleasing results in the panels when cold, a backing of any subdued color, such as deep blue, purple, warm brown, maroon, etc., is frequently used. This color is usually selected to be harmonious with whatever color the design may have been pigmented with, or which may have been printed or painted on the panel. As a general rule, these colors will be made to further harmonize with the appointments and coloring effects in the room in which they are set up.

Thus, while there may be, for instance, an old ivory design against a royal blue background when the panel is cold, this blue effect will disappear when the panel is illuminated at night and the background will become devoid of color, or black, while the design will show brilliantly in its pigmented color. Or, further, if the exposed edge of the glass panel be treated with a transparent color, the light entering through that exposed edge will illuminate the design with the color that has been applied to the edge. Thus, it will be seen that whereas the daylight combination may be a design in blue and ivory, the night or illuminated effect will be a black field and whatever color has been applied to the panel edge for the design. This diversity of color in the panel relieves monotony and sets up an entirely different aspect to the room; but which color, nevertheless, may be so selected as to harmonize with the appointments and color effects when these are no longer exposed to sunlight.

It is further possible to control the color of the free light escaping directly from the light source to the room ceiling by means of suitably colored screens interposed between the illuminating source and the ceiling or walls. These screens can be made interchangeable so that the color scheme may be varied from time to time as taste may dictate. The whole lends itself to a lighting device with unlimited possibilities of artistic effects and one which, while eliminating the glare of harsh direct illumination, provides the pleasing softness of color tones which contribute so much to the atmosphere of a room.

I claim:

1. An illuminable fixture, comprising a panel supporting holder, a plurality of stepped hyaline panels having illuminable indicia and mounted therein to afford successive illuminable display areas when viewed from the front of the holder, each area being provided with an opaque backing, and said panels being located respectively in contiguous parallel planes and with their respective display areas displaced relatively to one another and with a corresponding edge of each panel exposed, and a source of light associated with the panels in the holder for providing illumination of the illuminable display surfaces of said panels by internal reflection of the light rays from said source entering through the said exposed edges.

2. An illuminable fixture, comprising a panel supporting holder, a plurality of stepped hyaline panels having illuminable indicia and mounted therein to afford successive illuminable display areas when viewed from the front of the holder, each area being provided with an opaque backing, and said panels being located respectively in contiguous parallel planes and with their respective display areas displaced relatively to one another and with a corresponding edge of each panel exposed, and a source of light associated with the panels in the holder for providing illumination of the illuminable display surfaces of said panels by internal reflection of the light rays from said source entering through the said exposed edges, together with means for reflecting externally of the holder other rays of the source of light.

3. In an illuminable device: a succession of light-transmitting elements, affording respective longitudinally-displaced areas bearing illuminable indicia with opaque backing, and located in contiguous parallel planes with corresponding edges exposed, a source of light common thereto, invisible from the front of the device and so located with respect thereto as to permit light rays therefrom to pass through the exposed edges of said elements.

4. In an illuminable device: a succession of light-transmitting elements, affording respective longitudinally-displaced areas bearing illuminable indicia with opaque backing, and located in contiguous parallel planes with corresponding edges exposed, a source of light common thereto, invisible from the front of the device and so located with respect thereto as to permit part of the light rays therefrom to pass through the exposed edges of said elements, and reflector means to direct other rays from said source externally of the device.

5. In an illuminable device: a succession of light-transmitting elements, affording respective longitudinally-displaced areas bearing illuminable indicia with opaque backing, and located in contiguous parallel planes with corresponding edges exposed, an associated translucent panel, a source of light common thereto, invisible from the front of the device and so located with respect thereto as to permit part of the light rays therefrom to pass through the exposed edges, and other rays from said source to back-light said translucent panel.

6. In an illuminable device: a succession of light-transmitting elements, affording respective longitudinally-displaced areas bearing illuminable indicia with opaque backing, and located in contiguous parallel planes with corresponding edges exposed, an associated translucent panel, a source of light common thereto, invisible from the front of the device and so located with respect thereto as to permit part of the light rays therefrom to pass through the exposed edges, and other rays from said source to back-light said translucent panel, together with reflector means to direct further rays externally of the device.

7. An illuminable fixture, comprising a panel-supporting holder with laterally extending panel-supporting means affording stepped windows respectively located in contiguous planes and displaced with respect to one another, a plurality of hyaline panels mounted in the lateral panel-supporting means, bearing illuminable indicia and affording successive illuminable display areas with a corresponding edge of each panel exposed and each area being provided with an opaque backing, and a source of light in the holder associated with all of the panels for providing illumination of the illuminable display areas thereof by internal reflection of the light rays from said source entering through their said exposed edges.

8. An illuminable fixture, comprising a panel-supporting holder with longitudinal window and with laterally extending panel-supporting means affording stepped windows adjacent said window, respectively located in contiguous planes and displaced with respect to one another, a plurality of hyaline panels mounted in the lateral panel-supporting means, bearing illuminable indicia and affording successive illuminable display areas with a corresponding edge of each panel exposed and each area being provided with an opaque backing, together with an indicia-bearing panel closing the said window, and a source of light in the holder associated with all of the panels for providing illumination of the illuminable display areas thereof by internal reflection of the light rays from said source entering through their said exposed edges, other rays from said source serving to back-light the indicia of the window-closing panel.

9. An illuminable wall-fixture, comprising a panel-supporting holder with laterally extending panel-supporting means affording stepped windows respectively located in contiguous planes and displaced relatively to one another, a plurality of hyaline panels mounted in the lateral panel-supporting means, bearing illuminable indicia and affording successive illuminable display areas with a corresponding edge of each panel exposed and each area being provided with an opaque backing, means to secure the holder to a wall to displace the same therefrom and afford a lateral opening between the wall and the stepped panel-supporting means, and a source of light associated with all of the panels for providing illumination of the illuminable display areas thereof by internal reflection of the light rays from said source entering through the said exposed edges.

10. An illuminable wall-fixture, comprising a panel-supporting holder with window and with laterally extending panel-supporting means affording stepped windows respectively located in contiguous planes and displaced with respect to one another, a plurality of hyaline panels mounted in the lateral panel-supporting means, bearing illuminable indicia and affording successive illuminable display areas with a corresponding edge of each panel exposed toward the window-providing portion and each area being provided with an opaque backing, together with a panel closing the said window, means to secure the holder to a wall to displace the same therefrom and afford a lateral opening between the wall and the stepped panel-supporting means, and a source of light associated with all of the panels for providing illumination of the illuminable display areas thereof by internal reflection of the light rays from said source entering through the said exposed edges, other rays from said source serving to back-light the window-closing panel.

11. An illuminable directory fixture, comprising a housing with forward aperture, a frame associated therewith to fit the aperture and affording a rack of backing members respectively located in parallel planes and displaced relatively to one another, slide-holders adapted to be carried by the respective backing members in front of the same, slides of hyaline material bearing illuminable indicia and held by the respective holders, the corresponding edges of the different slides being exposed toward the interior of the housing, and a source of light located within the housing for providing illumination of the slides by internal reflection of light rays from said source entering through their said exposed edges.

12. An illuminable directory fixture, comprising a housing with forward aperture, a door swingably associated therewith to fit the aperture and affording a rack of backing members respectively located in parallel planes and displaced relatively to one another, slide-holders adapted to be carried by the respective backing members in front of the same and yieldingly urged in the direction of said aperture, slides of hyaline material bearing illuminable indicia and held by the respective holders, the corresponding edges of the different slides being exposed toward the interior of the housing, and a source of light located within the housing for providing illumination of the slides by internal reflection of light rays from said source entering through their said exposed edges.

13. An illuminable directory fixture, comprising a housing with forward aperture, a frame movably associated therewith to fit the aperture and affording a rack of backing members respectively located in parallel planes and displaced relatively to one another, slide-holders adapted to be removably carried by the respective backing members in front of the same, slides of hyaline material bearing illuminable indicia and held by the respective holders, the corresponding edges of the different slides being exposed toward the interior of the housing, and a source of light located within the housing for providing illumination of the slides by internal reflection of light rays from said source entering through their said exposed edges.

14. An illuminable directory fixture, comprising a housing with forward aperture and top opening, a frame associated therewith to fit the aperture and affording a rack of backing members respectively located in parallel planes and displaced relatively to one another, slide-holders adapted to be carried by the respective backing members in front of the same, slides of hyaline material bearing illuminable indicia and held in the respective holders, the corresponding edges of the different slides being exposed toward the interior of the housing, and a source of light located within the housing for providing illumination of the slides by internal reflection of light rays from said source entering through their said exposed edges, other rays therefrom being directed through the said top opening of the housing.

15. An illuminated directory board, comprising a cabinet having a forward opening, a frame mounted therein provided with supporting means arranged in step-like vertical sequence immediately behind the opening, a series of indicia-bearing panels mounted in the supporting means, visible through said opening, the said panels being disposed to each other in parallel planes and in vertical sequence, and a source of illumination within the cabinet behind the said panels.

16. An illuminated directory board, comprising a cabinet having a forward opening, a closure element mounted thereon and adapted to afford access to the interior of the cabinet, said closure element having a transparent window and being provided with supporting means arranged in step-like vertical sequence immediately inside the closure element, a series of indicia-bearing hyaline panels mounted in the supporting means, visible through the said window and adapted to be illuminated by internal reflection, the said panels being disposed to each other in parallel planes and in vertical sequence and having an edge of each panel unobstructedly exposed to the interior of the cabinet, and a source of illumination within the cabinet behind the said panels, light rays from which pass into said hyaline panels through the exposed edges thereof.

17. An illuminated directory board, comprising a cabinet having a forward opening and provided with an interior light-reflecting portion, a closure element mounted thereon and adapted for access to the interior of the cabinet, said closure element having a transparent window and being provided with supporting means arranged in step-like vertical sequence immediately inside the closure element, a series of indicia-bearing hyaline panels mounted in the supporting means, visible through the said window and adapted to be illuminated by internal reflection, the said panels being disposed to each other in parallel planes and in vertical sequence and having an edge of each panel unobstructedly exposed to the interior of the cabinet, and a source of illumination within the cabinet, light rays from which pass directly and by reflection from the said light-reflecting portion into said hyaline panels through the exposed edges thereof.

18. An illuminable slide member for an illuminable directory fixture, comprising a panel of hyaline material provided with illuminable indicia, and a holder extending over the back of the panel having discrete integral and foldable retaining means extending forwardly over the front thereof to retain said panel to the holder, and being provided with integral attaching means extending backwardly from the holder whereby to position the latter in the directory fixture.

19. An illuminable slide member for an illuminable directory fixture, comprising a panel of hyaline material provided with illuminable indicia, and a holder of opaque material extending entirely over the back of the panel having discrete integral and foldable retaining means extending forwardly over the front thereof to retain said panel to the holder, and being provided with integral attaching means extending backwardly from the holder whereby to position the latter in the directory fixture.

20. An illuminable slide member for an illuminable directory fixture, comprising a panel of hyaline material provided with illuminable indicia, and a holder of opaque material extending entirely over the back of the panel and bottom edge thereof and having lugs bent forwardly from its side and top edges and over the front of a panel to retain the panel to the holder, and being provided with further lugs extending backwardly from the upper edge of the holder whereby to suspend the latter.

21. In combination: an illuminable fixture adapted for association with a wall, means to secure the same to the wall in displaced relationship thereto to afford an opening between said wall and fixture, the latter comprising a light-transmitting member bearing illuminable indicia, and a source of light associated with the fixture and screened by the light-transmitting member thereof, part of the light rays therefrom illuminating by internal reflection solely the indicia of said member and other rays spreading through the said opening to illuminate an area about said fixture.

22. In combination: an illuminable fixture adapted for association with a wall, means to secure the same to the wall in displaced relationship thereto to afford an opening between said wall and fixture, the latter comprising a succession of light-transmitting elements afording respective longitudinally-displaced areas bearing illuminable indicia with opaque backing and located in contiguous parallel planes with corresponding edges exposed, and a source of light associated with the fixture and screened by the backing of said light-transmitting elements, part of the light rays from said source of light passing through the exposed edges of the light-transmitting elements to illuminate solely the indicia thereof and other rays from said source spreading through the said opening to illuminate an area about said fixture.

23. In combination: an illuminable fixture adapted for association with a wall, means to secure the same to the wall in displaced relationship thereto to afford an opening between said wall and fixture, the latter comprising a light-transmitting member including an element bearing illuminable indicia and a translucent element, and a source of light associated with the fixture and screened by the light-transmitting member thereof, part of the light rays therefrom illuminating by internal reflection solely the indicia of said indicia-bearing element, other rays from said source of light back-lighting the said translucent element, while still other rays from said source of light spreading through the said opening to illuminate an area about said fixture.

FRANCIS H. SCANTLEBURY.